United States Patent [19]

Wisbey

[11] Patent Number: 4,943,338
[45] Date of Patent: Jul. 24, 1990

[54] MULTI-TOW FIBER PLACEMENT MACHINE WITH FULL BAND WIDTH CLAMP, CUT, AND RESTART CAPABILITY

[75] Inventor: Jerry D. Wisbey, Cincinnati, Ohio

[73] Assignee: Cincinnati Milacron Inc., Cincinnati, Ohio

[21] Appl. No.: 248,702

[22] Filed: Sep. 26, 1988

[51] Int. Cl.⁵ .................. B32B 31/00; B65H 81/00
[52] U.S. Cl. ................... 156/433; 156/425; 156/429; 156/511; 156/523; 156/525; 156/520; 156/574
[58] Field of Search ............ 156/523, 574, 520, 576, 156/405.1, 441, 425, 361, 428-430, 511, 519, 433, 525

[56] References Cited

U.S. PATENT DOCUMENTS

| | | |
|---|---|---|
| 4,234,374 | 11/1980 | Frank . |
| 4,259,144 | 3/1981 | Ballentine . |
| 4,285,752 | 8/1981 | Higgins . |
| 4,351,688 | 9/1982 | Weiss et al. . |
| 4,382,836 | 5/1983 | Frank . |
| 4,526,647 | 7/1985 | Portalupi et al. ............ 156/405.1 X |
| 4,601,775 | 7/1986 | Grone . |
| 4,699,683 | 10/1987 | McCowin ................. 156/523 X |
| 4,708,761 | 11/1987 | Taniguchi et al. ........... 156/576 X |
| 4,790,898 | 12/1988 | Woods ..................... 156/441 |
| 4,867,834 | 9/1989 | Alenskis et al. ............. 156/425 X |

OTHER PUBLICATIONS

"Milacron Today", vol. 4, No. 6, published Jun. 16, 1989, by Cincinnati Milacron Inc., front page Article entitled: Fiber Placement: Automating Complex Composite Parts Processing.
Fiber Placement Process Study by Don O. Evans, Milo M. Vaniglia and Paul C. Hopkins, published in SAMPE 34th Symposium Book of Proceeding, May 8-11, 1989.

Primary Examiner—Michael W. Ball
Assistant Examiner—Jeff H. Aftergut
Attorney, Agent, or Firm—Thomas M. Farrell

[57] ABSTRACT

A fiber placement machine has a head for controlling fiber tows running from an upstream supply creel to a downstream work laydown zone, and the head includes a bracket supporting a presser member which impresses and compacts the fiber against a workpiece. The head includes a relatively rigid fiber guide assembly and a drive for moving the fiber guide to an advanced position near the presser member and a retracted position away from the presser member. In the advanced position, fiber tows run uninhibited through channels in the fiber guide. However, when it is desired to cut the fibers, the fiber guide is run to the retracted position, at which point the guide is clamped to the incoming fiber tows. After the exiting cut fiber has been laid down on the workpiece by the presser member, the incoming fibers may be restarted by driving the fiber guide and its clamped fiber tow to an advanced position where the fiber tow end may be grabbed in the nip formed between the presser member and the workpiece. At such moment, the fiber guide clamp is released to again permit free running of the tows through the fiber guide.

7 Claims, 22 Drawing Sheets

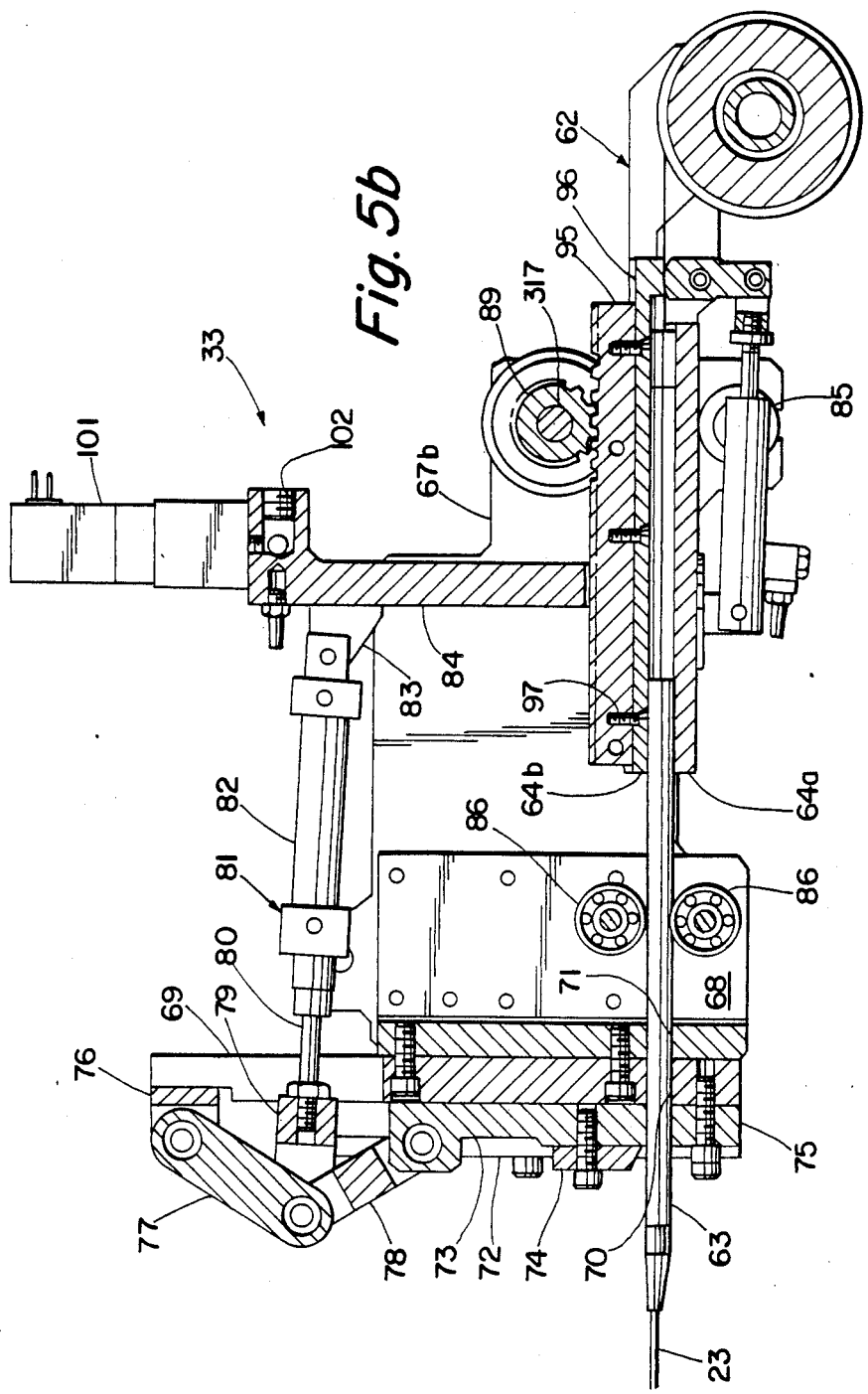

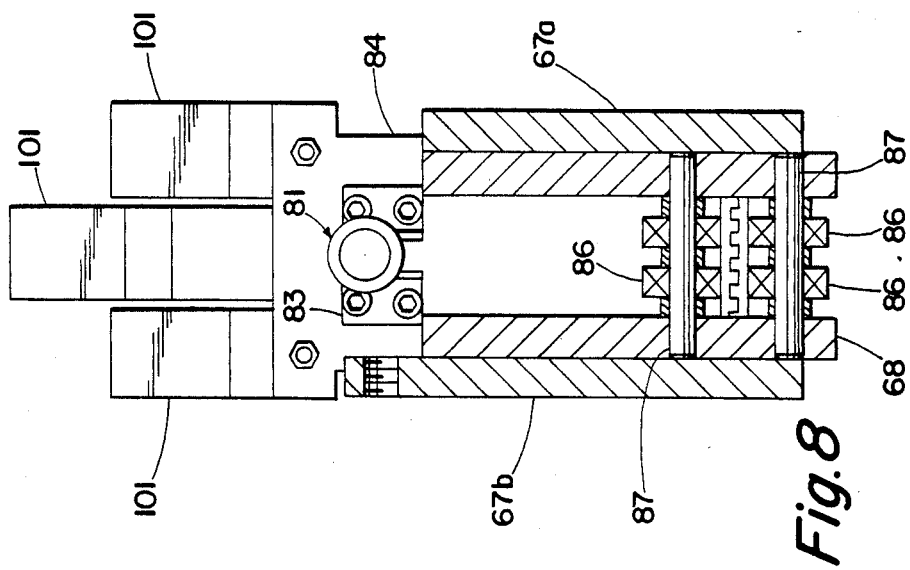
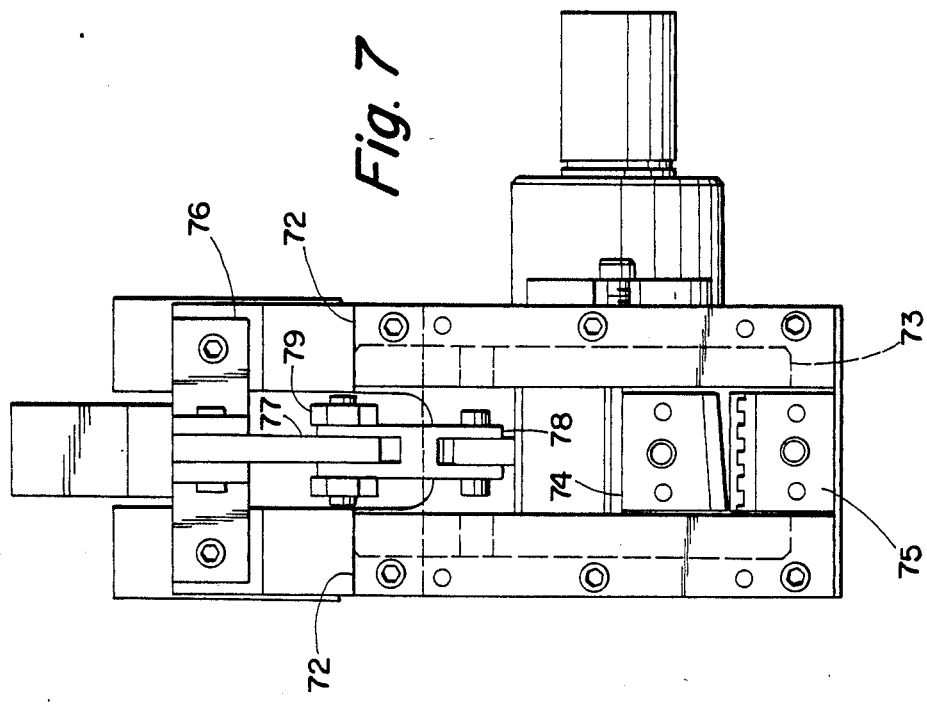

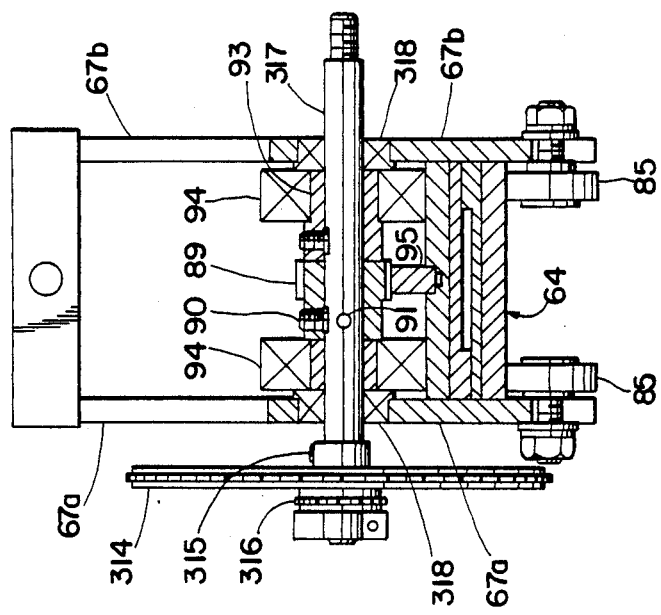
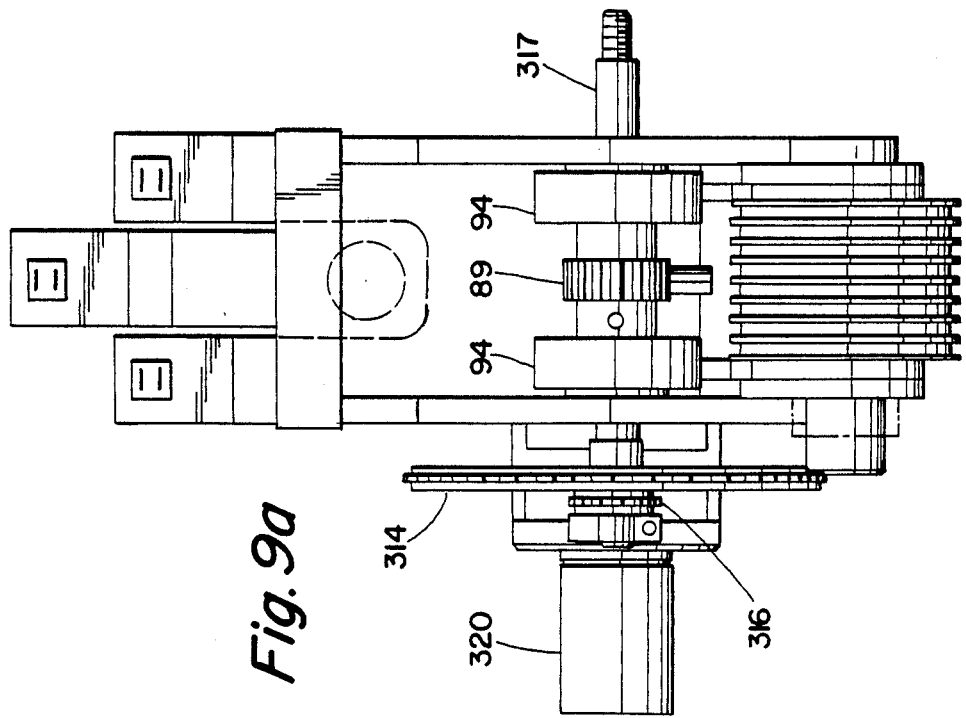

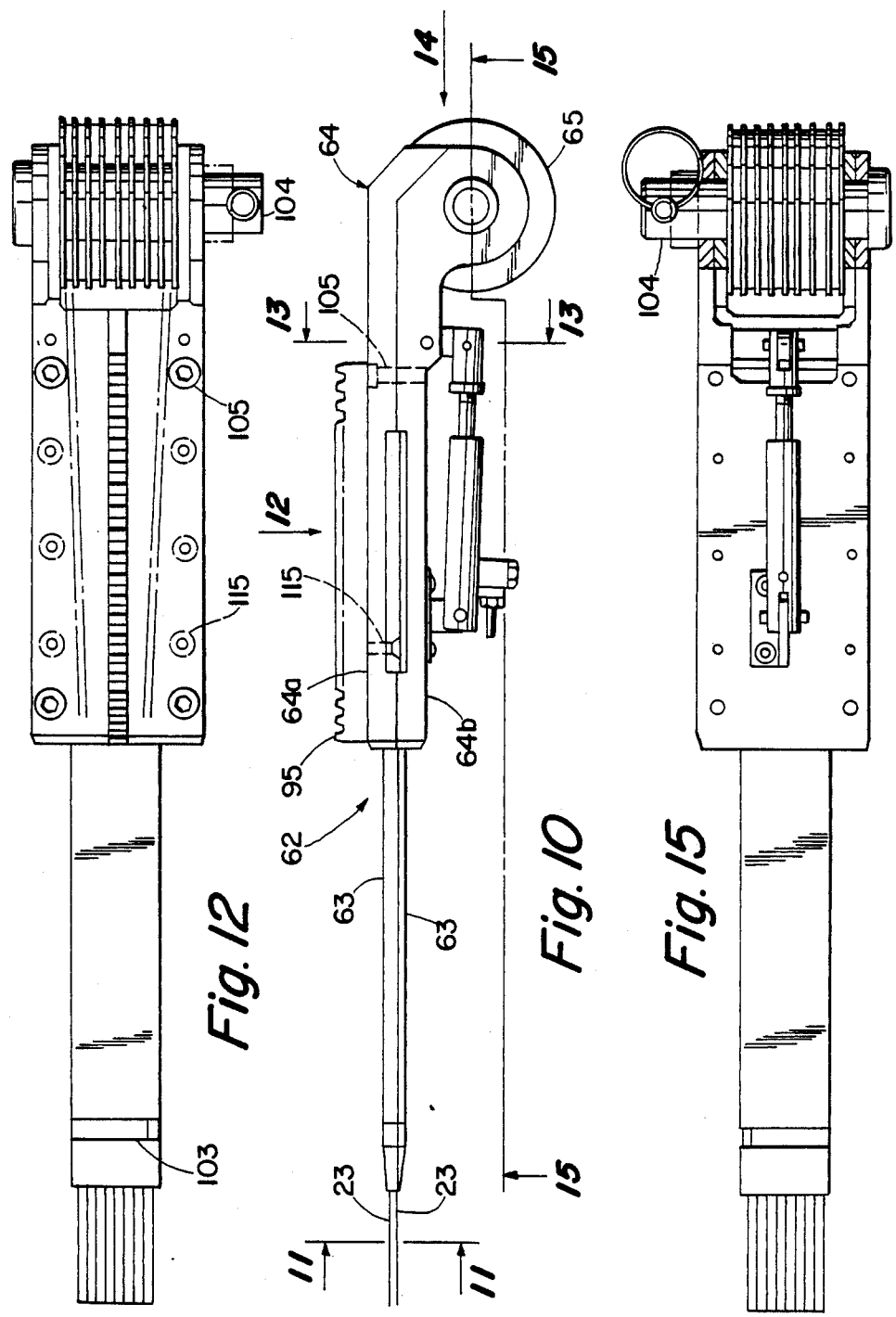

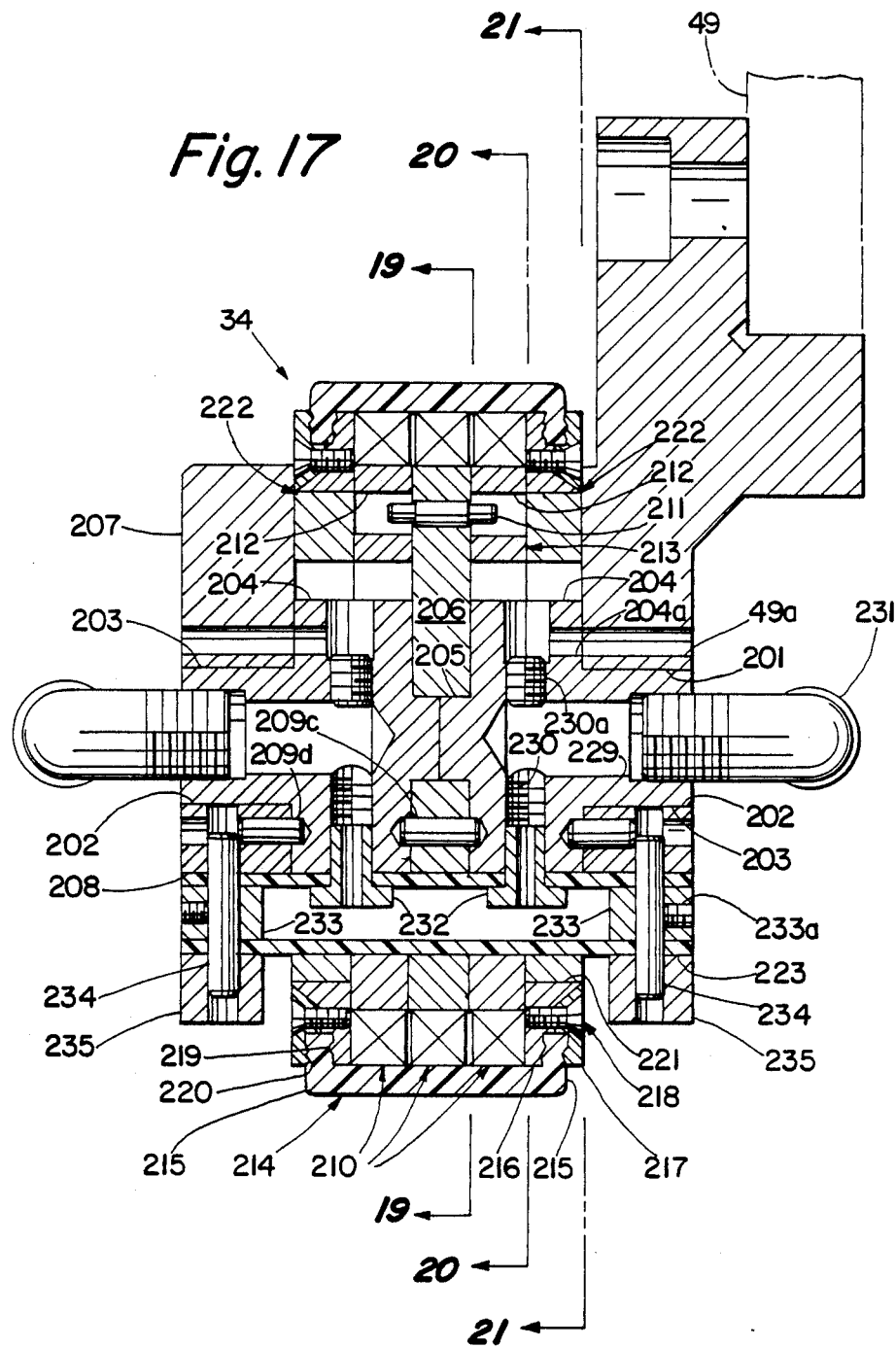

MULTI-TOW FIBER PLACEMENT MACHINE WITH FULL BAND WIDTH CLAMP, CUT, AND RESTART CAPABILITY

BACKGROUND OF THE INVENTION

The invention relates to fiber placement machines which employ multiple strands or tows of fiber which are pulled from a creel assembly and placed on a surface or workpiece.

Fiber placement machines may be employed to lay tows of fiber on flat, curved, or compound contours.

In one typical state-of-the-art assembly e.g., a filament winder, fibers are usually wound on convex surfaces on a rotating mandrel by a head having a fiber payout eye, the fibers held in tension as the fiber head reversibly traverses the axial length of the rotating mandrel.

Applicant's assembly is arranged to deposit strands of fiber on a variety of work surfaces, stationary as well as moving, and including concave surfaces.

SUMMARY OF THE INVENTION

The invention is shown embodied in a fiber placement machine having an improved placement head, where the machine has a machine member for carrying the placement head; an upstream fiber supply source—for example fiber-wound spools; a downstream work laydown zone; means for providing relative movement between the machine member and the work laydown zone; and, where a fiber length runs from the upstream source to the downstream laydown zone in accordance with the control of the head, the improved head comprising in combination: a bracket affixed to the machine member; presser means on the bracket for impressing a fiber in the work zone; a fiber guide means movably mounted to the bracket and including means for permitting relatively free movement of the fiber with respect to the guide means and means for clamping the fiber to the guide means; and a drive means for relative moving the fiber guide means with respect to the bracket between an advanced position near the presser means and a retracted position away from the presser means. The preferred embodiment includes means for cutting the fiber while the fiber guide is in the retracted position.

BRIEF DESCRIPTION OF THE DRAWINGS

FIG. 3b is a top plan view taken in the direction of arrow 3b of FIG. 3a.

FIG. 3c is a section through the biasing spring assembly of the clamp, cut, and restart unit taken along the line 3c—3c of FIG. 3a.

FIG. 3d is a section through the pivot joint assembly of the clamp, cut, and restart unit, taken along the line 3d—3d of FIG. 3a.

FIG. 4a is a side elevational view taken along the line 4a—4a of FIG. 3a.

FIG. 4b is an elevational section taken along the line 4b—4b of FIG. 3a.

FIG. 5a is a close-up front elevational view of the clamp, cut, and restart unit of FIG. 3a.

FIG. 5b is a sectional view taken through the clamp cut, and restart unit of FIG. 3a.

FIG. 6 is a bottom plan view in partial section of the clamp, cut, and restart unit, taken along the line 6—6 of FIG. 5a.

FIG. 7 is a left-hand elevational view of the clamp, cut, and restart unit, taken in the direction of arrow 7 of FIG. 5a.

FIG. 8 is a sectional view through the tow guide housing guide rollers taken along the line 8—8 of FIG. 5a.

FIG. 9a is an end elevational view, taken in the direction of arrow 9a of FIG. 5a.

FIG. 9b is an elevational section taken along the line 9b—9b of FIG. 5a.

FIG. 10 is an isolation view of the tow guide housing.

FIG. 12 is a top view of the tow guide housing taken in the direction of the arrow 12 of FIG. 10.

FIG. 15 is a bottom view of the tow guide housing, in partial section, taken along the line 15—15 of FIG. 10.

FIG. 17 is a section through the axis of the presser member assembly of FIG. 3a.

DESCRIPTION OF THE PREFERRED EMBODIMENT

The presser member assembly 34 described in FIGS. 17-22 is the subject of a copending application, Ser. No. 248,695 filed Sept. 26, 1988, entitled Compliant Presser Member for Fiber Placement Machine, now U.S. Pat. No. 4,869,774 the disclosure of which is incorporated herein by reference.

Figure 1:
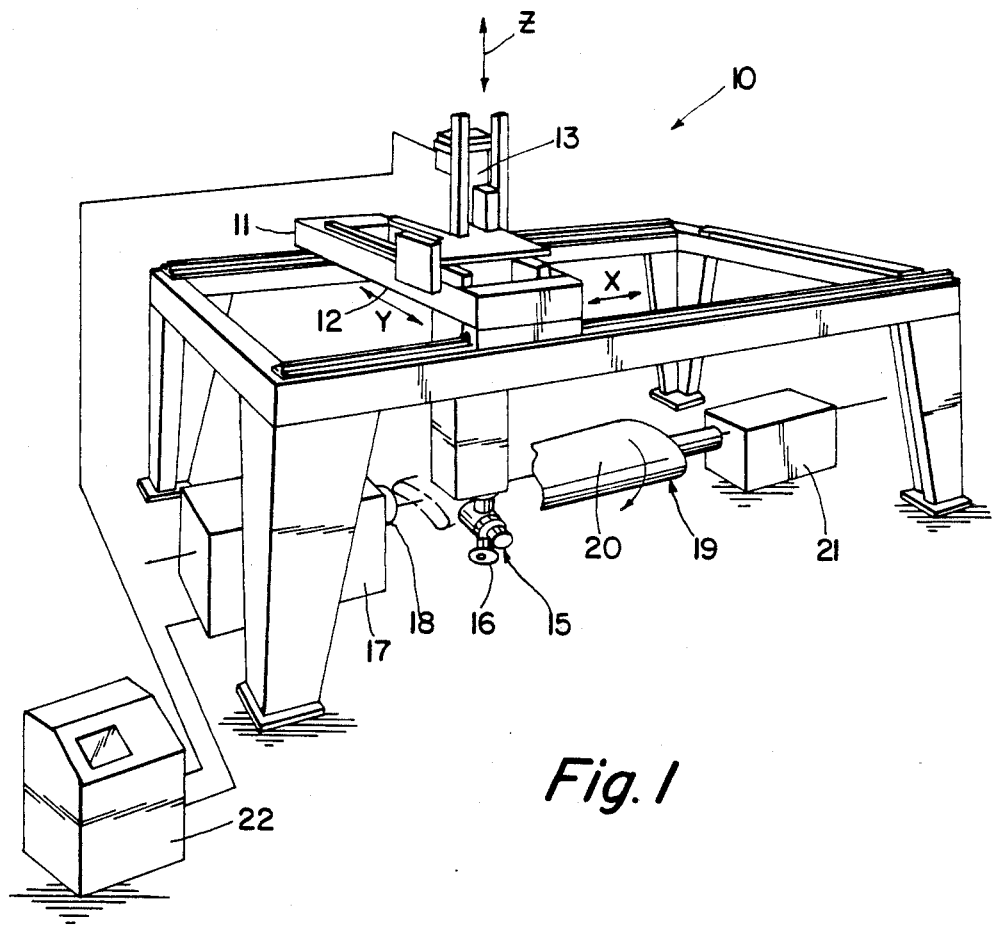
FIG. 1 is a perspective view of a fiber placement machine.

FIG. 1 shows a gantry machine or robot 10 having an elevated way system suitable for carrying a carriage 11 and cross-slide 12 in X and Y directions, in a plane parallel to the floor. The cross-slide 12 supports a saddle 13 for vertical movement, and the saddle 13 has a forearm 14 which contains a drive mechanism (not shown)

for actuating a wrist 15 supported at the end of the forearm 14. The forearm 14 and wrist 15 are manufactured substantially as the serial roll wrist depicted in the U.S. Pat. No. 4,068,536, assigned to Cincinnati Milacron Inc., the assignee of the present invention. The gantry robot 10 depicted in FIG. 1 is commercially available from Cincinnati Milacron Inc., under the Model No. T3-886 gantry series industrial robot, and other similar mechanisms will suffice. As described in the aforementioned U.S. patent, the wrist 15 has the capability of moving a tooling plate 16 in three degrees of rotary motion, and a desired tool assembly, or end effector (not shown), is affixed to the tooling plate 16. It will be appreciated that other wrists, for example, the roll-bend-roll variety of manipulators, may be employed.

A variety of work may be positioned on the floor within the range of the tooling plate 16. The work may be flat or curved; rotating or stationary.

A servo-controlled mandrel unit 17 is shown, having a rotary spindle 18 for positioning an exemplary workpiece, such as an air foil form 19. The mandrel unit 17 is, in effect, a headstock capable of supporting, driving, and positioning work about a reference axis 20, here shown horizontally.

Here it should be noted that a variety of mandrel units and auxiliary footstocks 21 may be suitable for positioning work.

A computer numerical control (CNC) 22 is employed to control the multi-degree-of-freedom spatial positioning of the tooling plate 16 and selected end effector. The CNC 22 also controls the work position about the reference axis 20. One such control is commercially-available under the trademark ACRAMATIC—Model 975-C CNC, from Cincinnati Milacron Inc.

Figure 2:
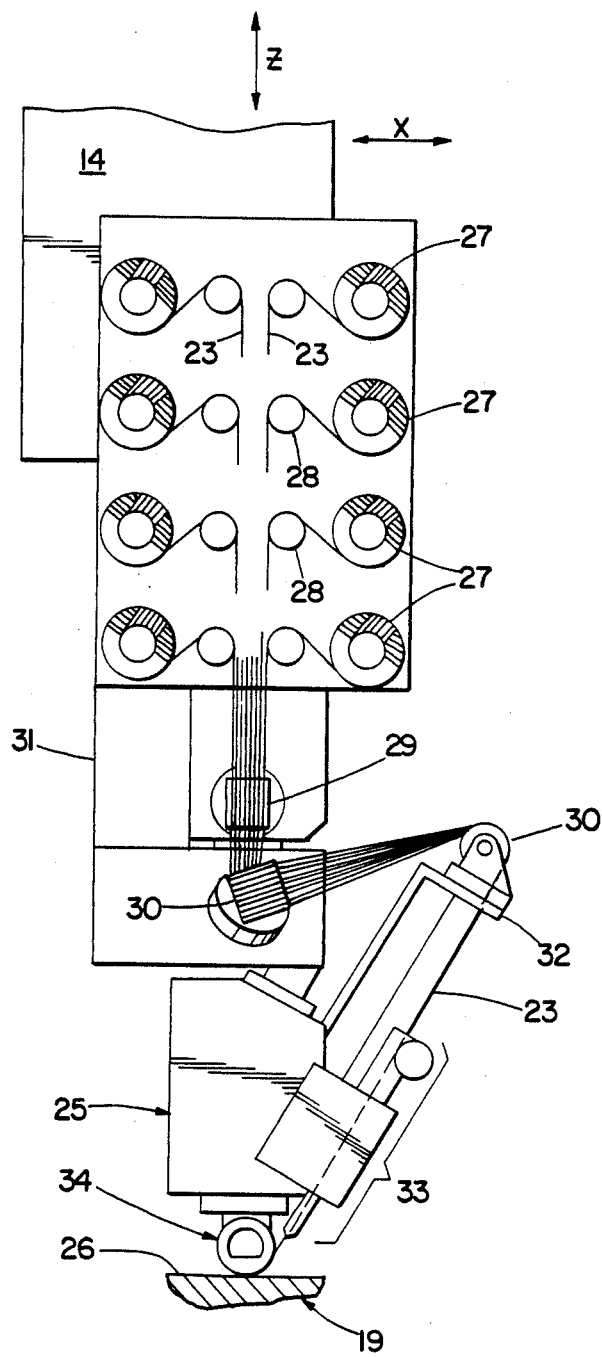
FIG. 2 is an elevational view showing the vertical forearm of the fiber placement machine of FIG. 1 supporting a fiber placement head.

With reference to FIGS. 1 and 2, the machine 10 is arranged to place long and short lengths of fiber tows 23 on the air foil form 19 in an operation similar to filament winding, but where the tows may extend along concave, or undercut, surfaces.

FIG. 2 schematically depicts the vertical forearm 14 of FIG. 1 with a creel assembly 24 mounted thereto. A fiber placement head 25 is affixed to the wrist tooling plate 16 and is wieldable to approach the workpiece surface 26, it being appreciated by those skilled in the art that the surface may be curved as well as flat, and the surface 26 may move with respect to the fiber placement head 25 and vice-versa. The creel assembly 24 and fiber placement head 25 are thus movable on a common forearm 14 and the wrist 15 provides relative movement between the placement head 25 and the creel assembly 24. The creel assembly 24 is depicted schematically as having eight spools 27 of fiber tows 23, each tow 23 pulled from a spool 27 and trained over a respective tension maintaining roller 28, in a manner known in the art. The eight tows 23 depicted are guided around a grooved roller 29 affixed to the forearm 14, and are then trained around a pair of redirect rollers 30 carried on a creel bracket 31 and an outboard support bracket 32 of the placement head 25. Note: the roller 30 is actually an assembly of discrete, independently rotatable, single-groove roller segments similar to that depicted in FIG. 6. The redirect rollers 30 are mounted in bearings so that they may swivel and thus be automatically oriented in accordance with tension of the fiber tows 23. The tows 23 are brought through a clamp, cut and restart unit ("CCR" unit) 33 and are finally brought around a presser member assembly 34 where they are impressed on the work surface 26.

Figure 3A:
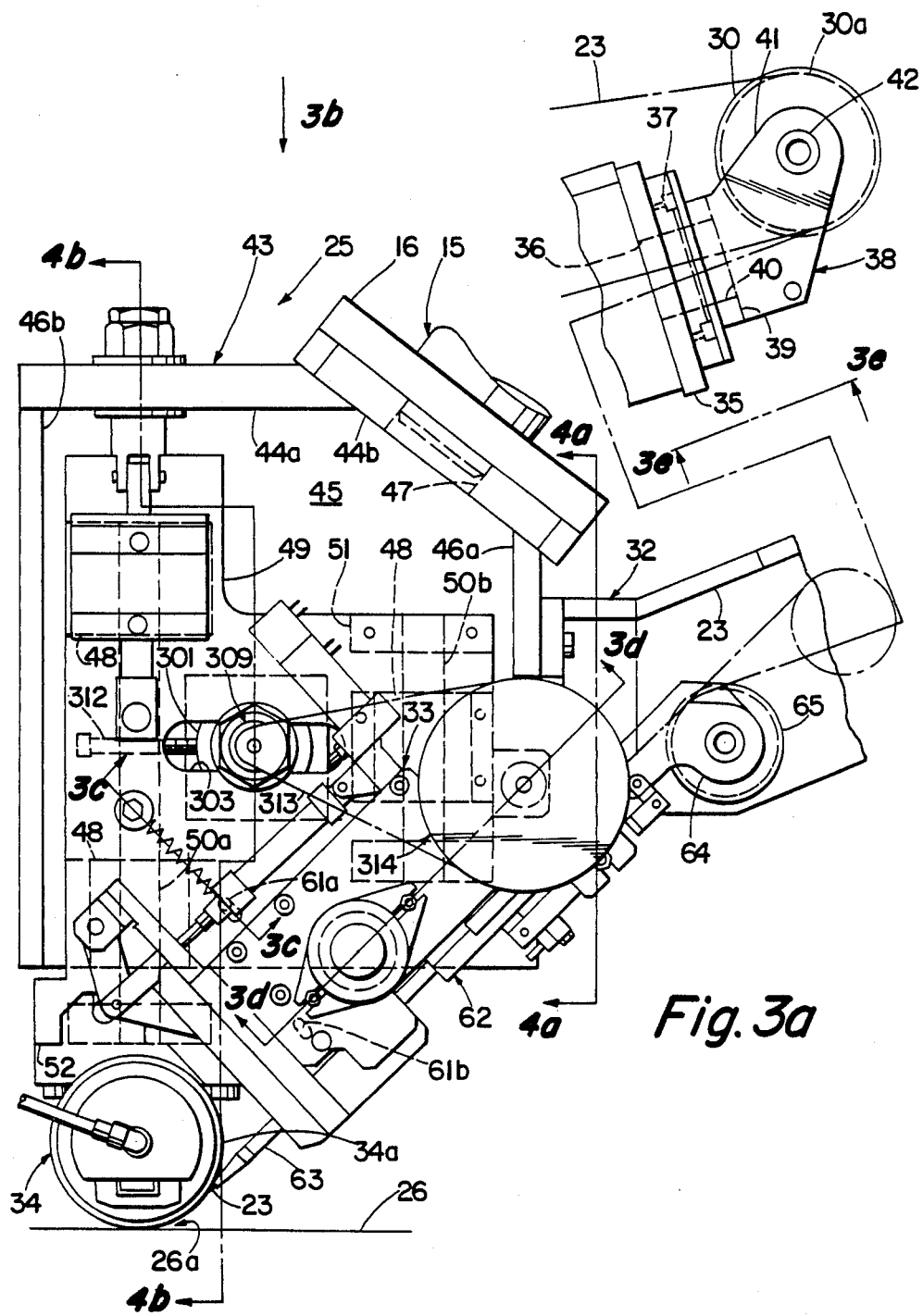
FIG. 3a is a close-up elevational view of the fiber placement head of FIG. 2.
Figure 3B:
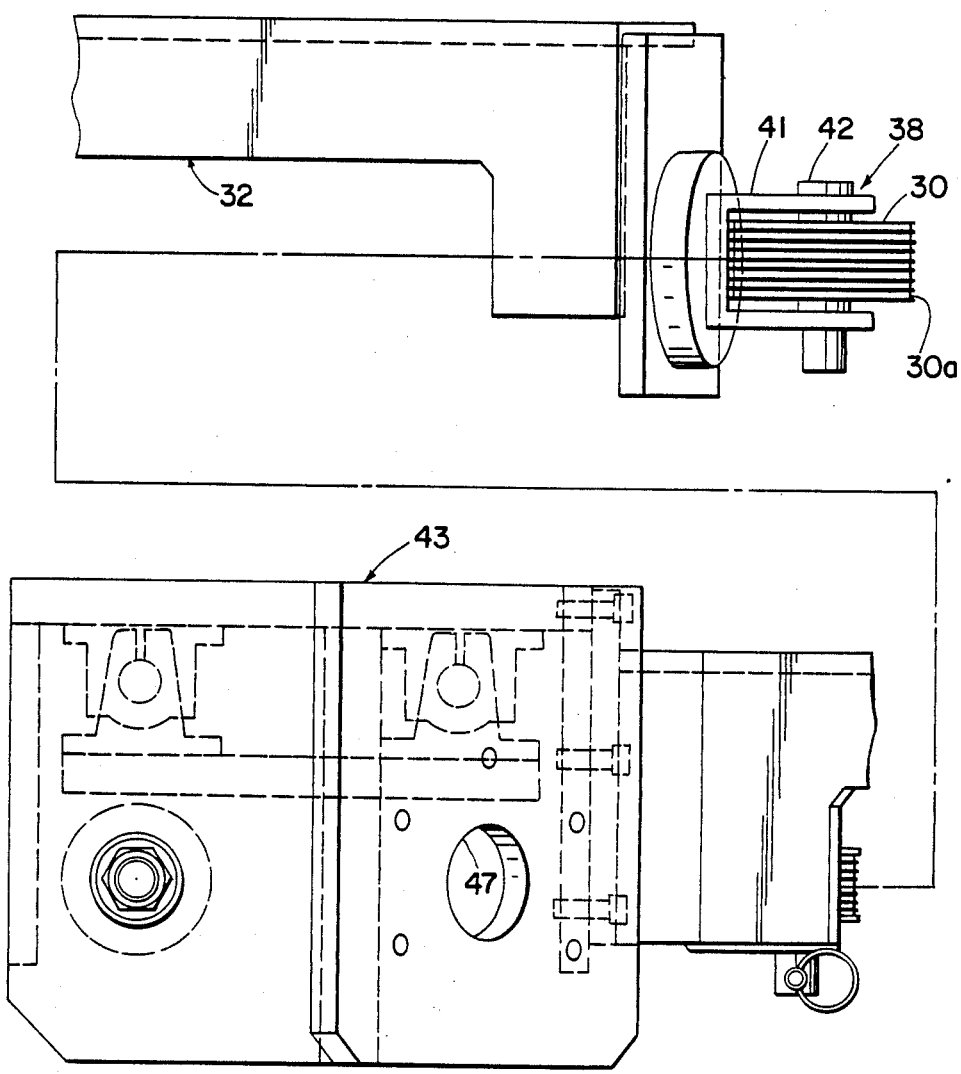

Referring now to FIG. 3a, the fiber placement head 25 is shown in more detail, affixed to the tooling plate 16 of the wrist 15. The topmost end of the outboard support bracket 32 of the placement head 25 is fabricated of a plate 35 having a through clearance hole 36, and the plate 35 supports an antifriction bearing 37 which carries the redirect roller assembly 38. The assembly 38 is fabricated from a plate 39, having a through clearance hole 40, and welded parallel side plates 41 (see also FIG. 3b). The parallel plates 41 captivate the redirect roller 30 which is freely journalled on a tubular support shaft 42 extending through the side plates 41. The fiber tows 23 are depicted parallel to one another, extending around grooves 30a in the roller 30, and passing down through the open outboard bracket 32 to the CCR unit 33.

Figure 3C:
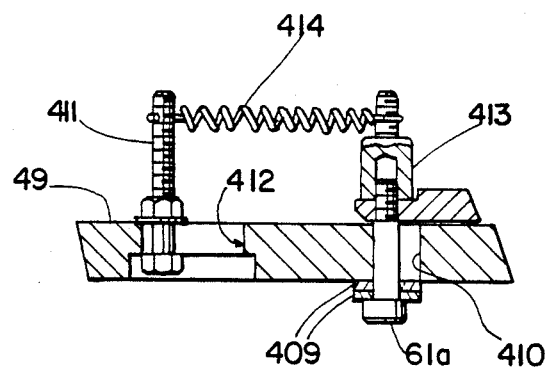
Figure 3D:
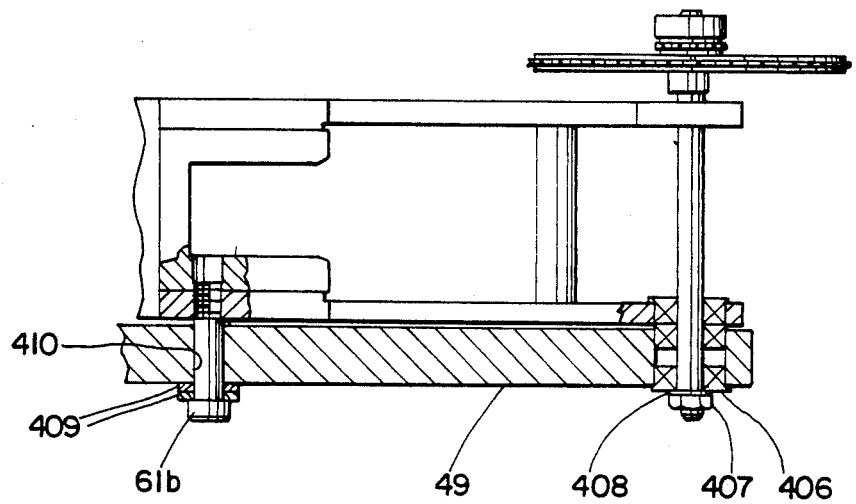
Figure 3E:
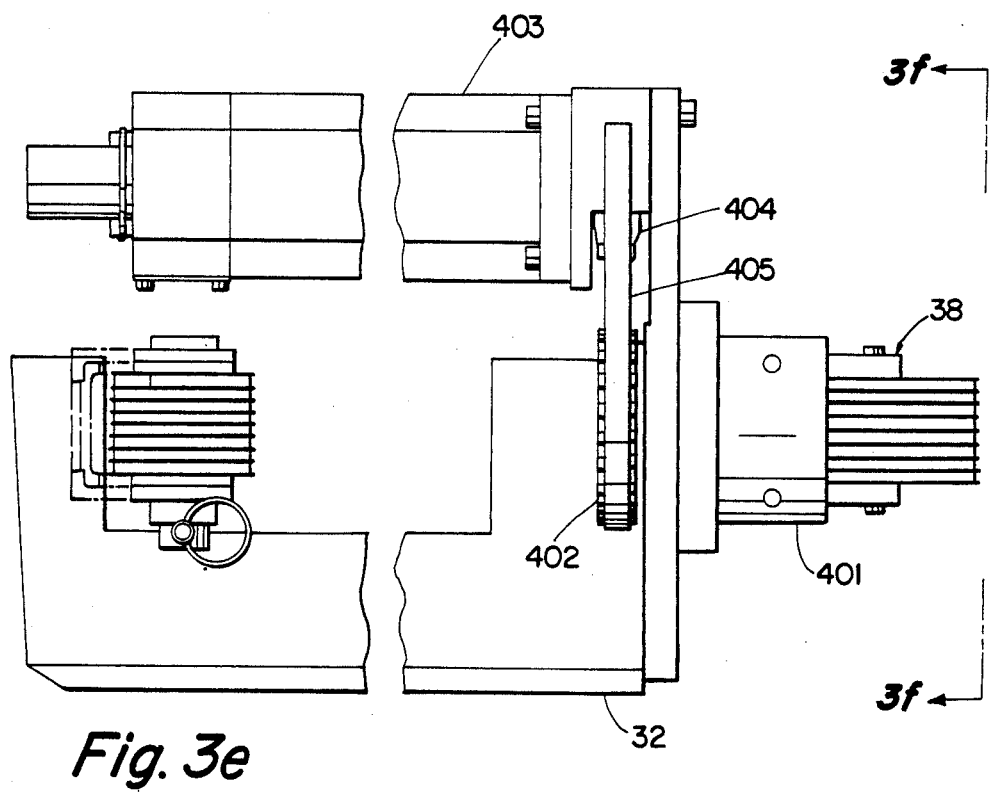
FIG. 3e is a plan view of a servo-driven re-direct roller assembly.
Figure 3F:
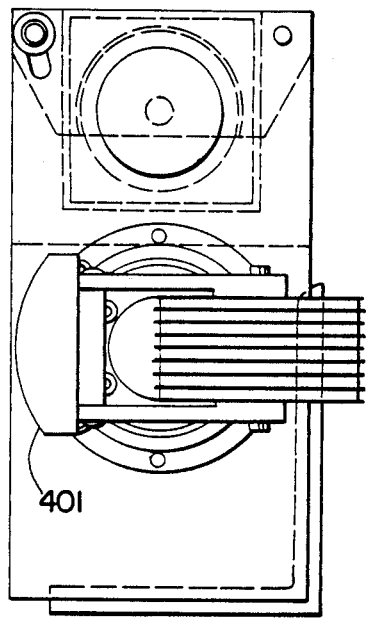
FIG. 3f is an end view of a servo-driven re-direct roller assembly, taken along the line 3f—3f of FIG. 3e.

FIGS. 3e and 3f depict an alternate embodiment of the re-direct roller assembly 38, where the assembly 38 is fitted with a counterweight 401 and a driven pulley 402. A servo-motor 403 is carried by the outboard support bracket 32 and has a drive pulley 404 and belt 405 to provide positive controlled movement to the roller assembly 38.

The main bracket 43 of the placement head 25, see FIGS. 3a,b and 4a,b, is comprised of a fabrication, having a horizontal top plate 44a, an angled top corner plate 44b, and a vertical back plate 45, welded with side gussets 46a,b. A pilot bore 47 is provided through the top corner plate 44b for registration on the wrist tooling plate 16. Three vertically-oriented ball bushings 48 are affixed to the vertical plate 45 of the main bracket 43, for guiding a vertical slide 49. The slide 49 has a pair of precision bars 50a,b affixed to the rear by suitable support blocks 51, the bars 50a,b being free to ride vertically in the ball bushings 48. The slide 49 is configured as a notched plate, of uniform thickness, and the lowermost slide edge 52 carries the presser member assembly 34, which will be described further in connection with FIGS. 17–21. A clevis bracket 53 is affixed to the upper plate 44a of the main bracket 43, and a cylindrical standoff block 54 is located against the front face of the slide 49. A vertically-oriented fluid actuator 55 has a cylinder 56 connected by a cylinder extension 57 and pin 58 to the clevis bracket 53, and a piston rod 59 of the cylinder 56 is connected by a pivot bolt 60, passing through the standoff block 54 and into the slide 49. Therefore, pressurized fluid may be used to control the slide 49 relative to the main bracket 43.

Referring to FIG. 3a, the CCR unit 33 is shown aligned at approximately 45 degrees to the vertical, and the fiber tows 23 are trained from the redirect roller 30 to the presser member assembly 34, through the CCR unit 33. The CCR unit 33 is pivotally affixed on a shaft journalled in bearings 406 mounted in the vertical slide 49 (see FIG. 3d), and a locknut 407 and washer 408 are received on the shaft 317 to secure the assembly. A pair of shoulder screws 61a,b extend from the rear through washers 409 and slots 410 in the slide 49, to permit pivotal movement of the CCR unit 33. FIG. 3c shows an adjustably-positionable screw 411 inserted from the rear through a slot 412 in the slide 49, and a spring-pin 413 threadably-received as a cap on the shoulder screw 61a. An extension spring 414 is hooked onto the screw 411 and spring-pin 413 to provide an upward biasing force on the CCR unit 33. Further functions of the shaft 317 will be shown and described in connection with FIG. 9b.

The CCR unit 33 carries a slidable tow guide housing 62 including identical, cooperating tow guide plates 63 and a tow drive housing 64 having a tow guide roller assembly 65. The solid outline shown in FIG. 3a is the intermediate position of the tow guide housing 62, and the phantom outline is the retracted position (the plates 63 and tow drive housing 63,64 moving in unison). A servomotor 66 extends rearwardly from the slide 49 and serves to drive the tow guide housing 62 between fully-advanced, intermediate and retracted positions, relative to the presser member assembly 34.

Figure 4A:
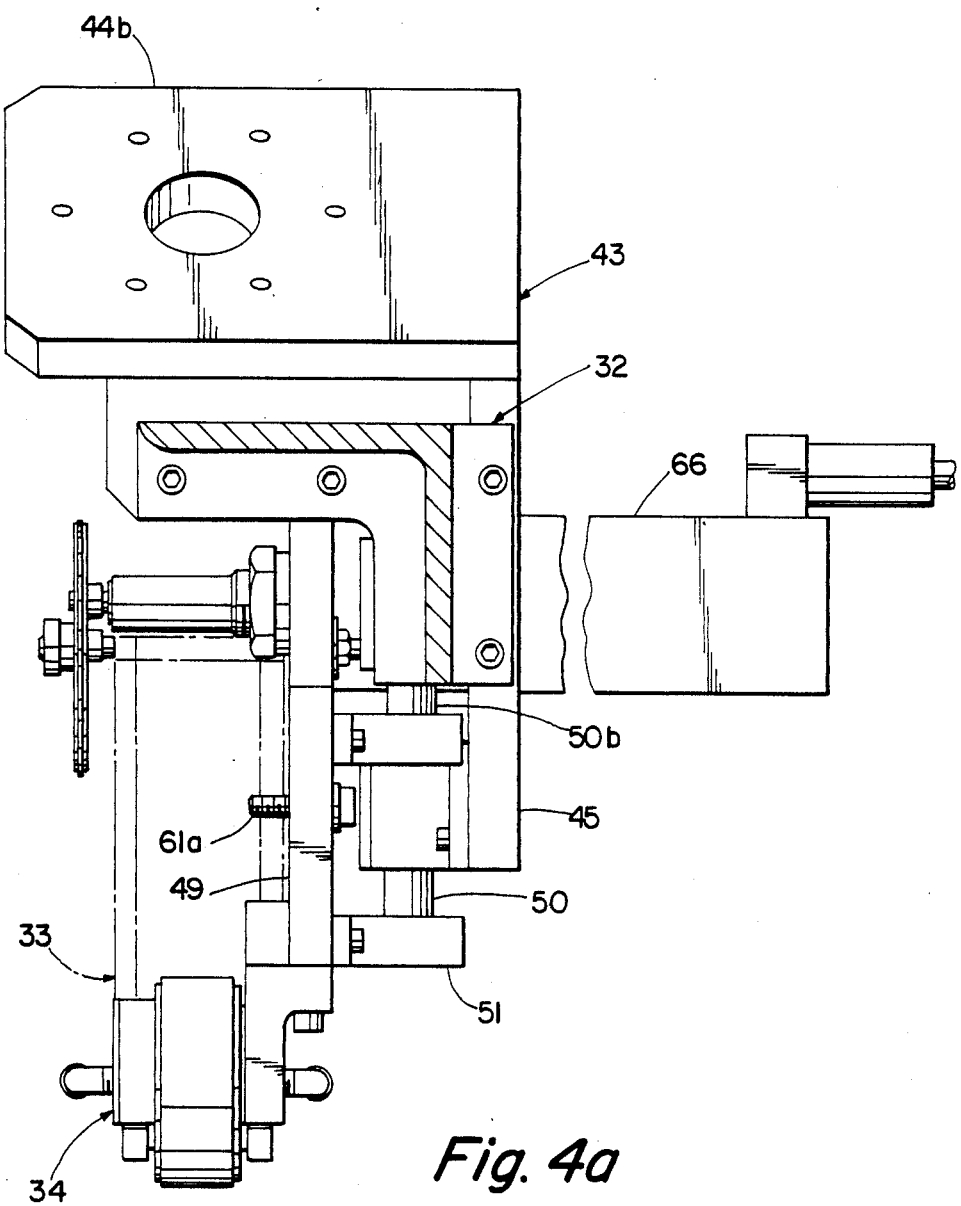

Here it may be noted that in the fully-advanced position, the two guide plates 63 will be slightly deflected downward by the presser member assembly 34, in opposition to the upward force of the biasing spring 414, and the plates 63 will be restored to their usual attitude when driven to the intermediate position. The CCR unit 33 has been removed in FIGS. 4a and 4b, for clarity, and is simply designated by phantom lines.

Figure 4B:
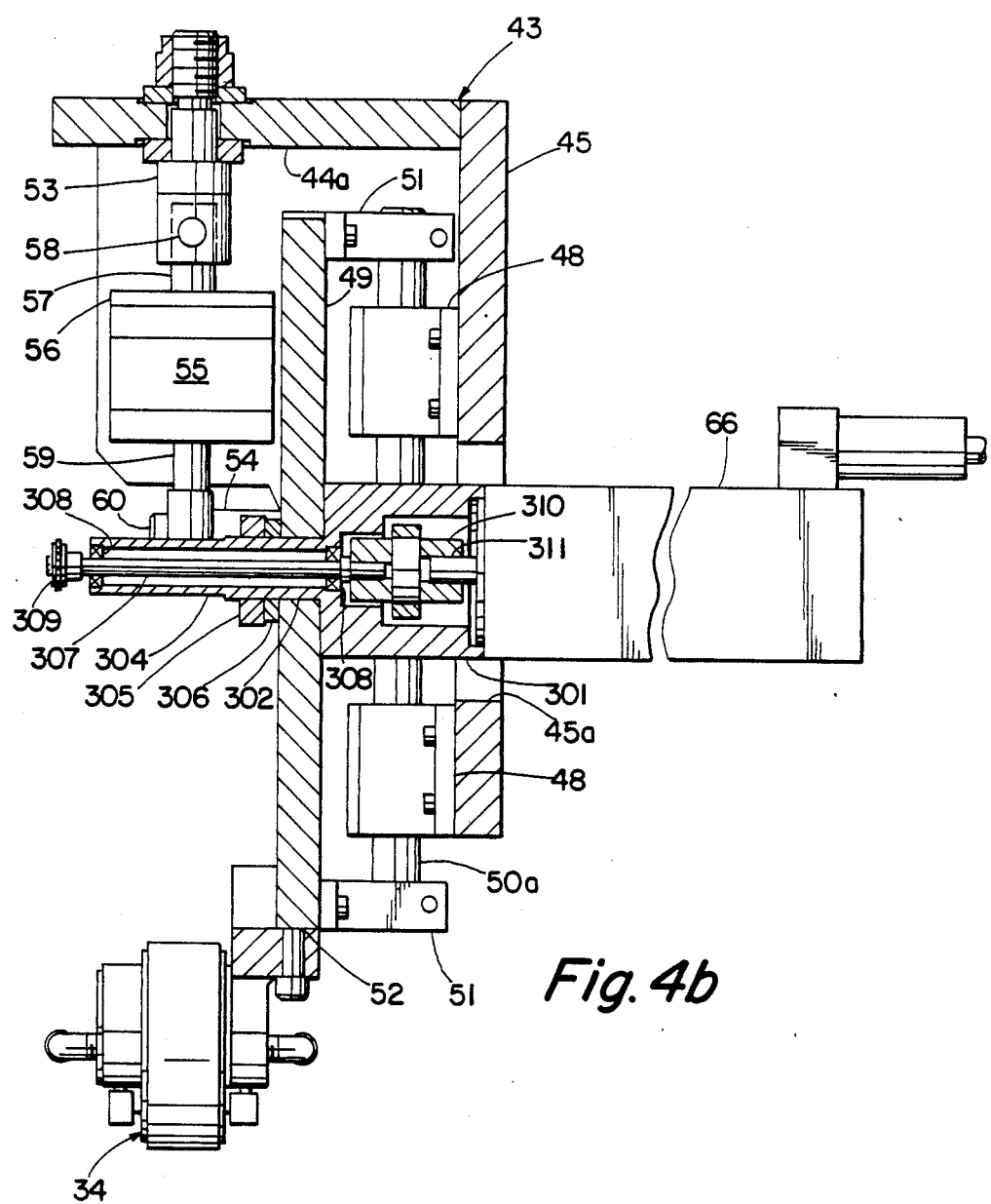

Referring to FIG. 4b, a servomotor mounting block 301 is affixed to the slide 49 by means of a pilot diameter 302 passing through a horizontal slot 303 in the slide 49. A tubular block extension 304 extends frontwardly from the slide 49 and a nut 305 and washer 306 are received on the extension 304 to secure the block 301. The hollow extension 304 houses a sprocket drive shaft 307, supported on antifriction bearings 308. The shaft 307 carries a small first drive sprocket 309 on its outboard end, while a coupling 310 connects the inboard end of the shaft 307 to the motor shaft 311. The servomotor 66 is affixed to the rear face of the mounting block 301, and both extend through an aperture 45a in the vertical plate 45.

As shown in FIG. 3a, an adjusting screw 312 passes through the side of the slide 49, into the slot 303, and is threadably received in the servomotor mounting block 301 for adjusting tension on a first drive belt 313. The belt 313 is trained around the first drive sprocket 309 and a larger, first driven sprocket 314.

CLAMP, CUT AND RESTART UNIT

With reference to FIG. 9b, the driven sprocket 314 is affixed by a set screw 315 and secured, along with a second drive sprocket 316, to a gear shaft 317 rotatably mounted in antifriction bearings 318 located in the side walls 67a,b of the CCR unit 33.

Figure 5A:
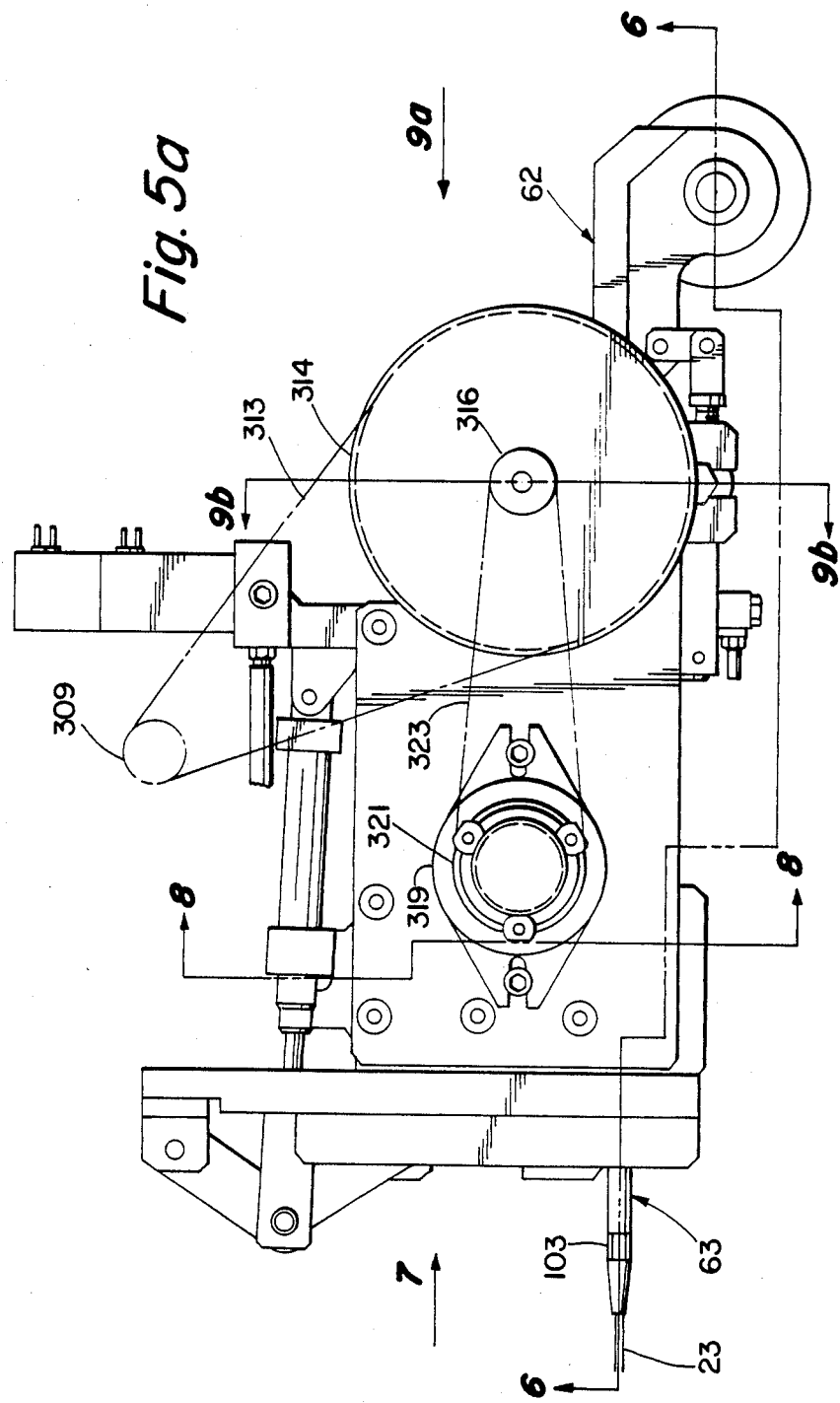

FIG. 5a is a front elevational view of the CCR unit 33, with the tow guide housing 62 shown in the intermediate position. A resolver housing 319 is mounted to the side plate 67a of the CCR unit 33, and carries a resolver 320 having a second driven sprocket 321 affixed to the resolver shaft 322 (see also FIG. 6). A second belt 323 is trained around the second driving and driven sprockets 316,321 to provide a feedback signal indicating position of the tow guide housing 62.

Figure 6:
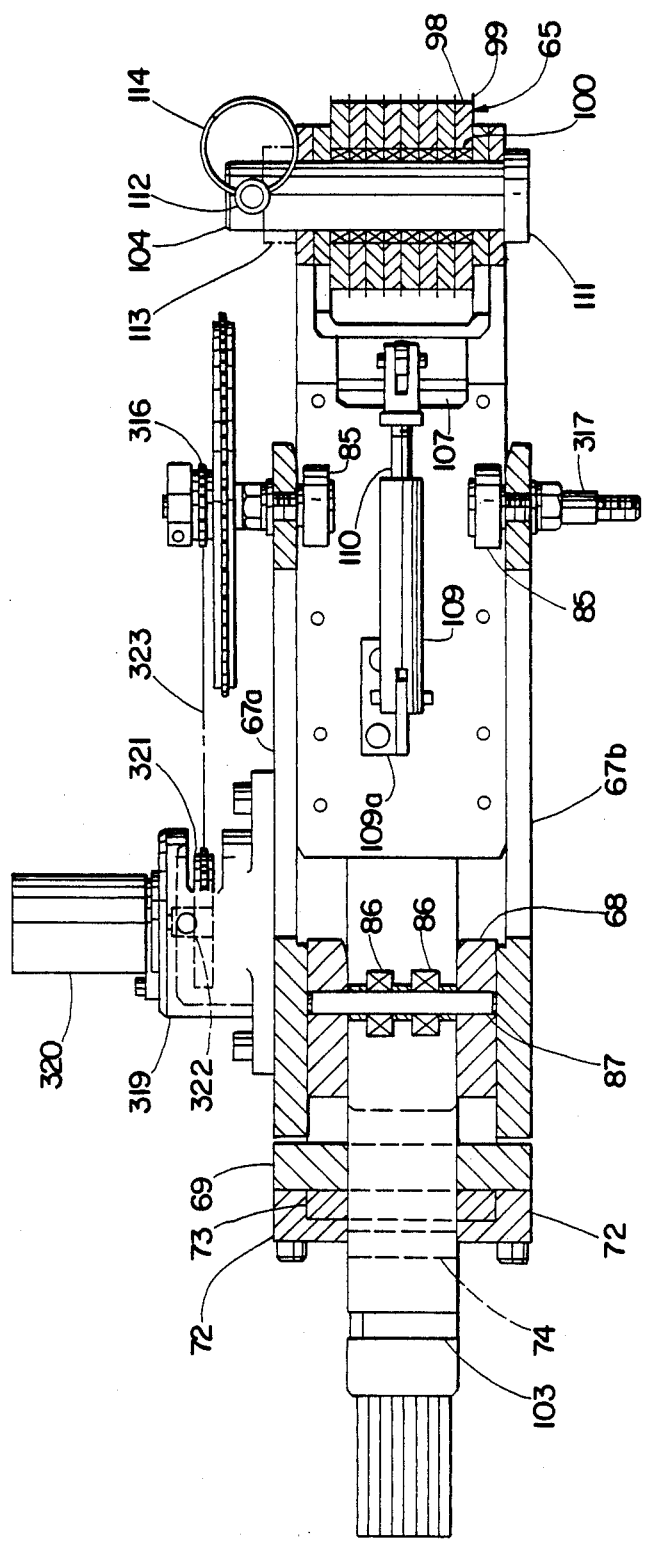
Figure 14:
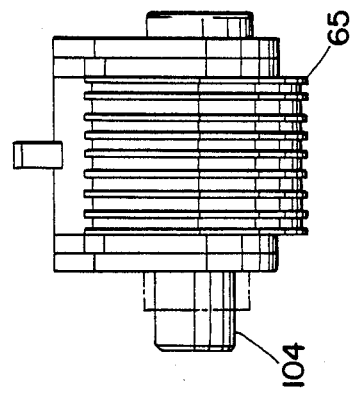
FIG. 14 is an end view, showing the guide roller, taken in the direction of the arrow 14 of FIG. 10.

Referring to the sectional view of FIG. 5b, the CCR unit 33 is an open structure, having similar side walls 67a,b machined from plate, and affixed to a U-shaped channel bracket 68 (see also FIG. 6). The channel bracket 68, in turn, carries a front plate 69. The front plate 69 and channel bracket 68 each have a through aperture 70,71, so that the tow guide housing 62 may pass freely. The front plate 69 carries a pair of rails 72 which guide a knife slide 73 vertically, the knife slide 73 carrying a movable knife blade 74 at its lowermost end. The slide 73 is shown in the "up" position. In the "down" position, the knife blade 74 will shear the fiber tows 23 across a cooperating knife anvil 75, which is secured to the lower portion of the front plate 69. The top of the front plate 69 supports a clevis bracket 76, and upper and lower pivot links 77,78 are serially joined to the clevis bracket 76, to each other, and to the knife slide 73. The junction of the upper and lower links 77,78 is also connected to a transversely-movable third link 79, affixed to the piston rod 80 of a fluid actuator 81, the actuator 81 having a cylinder 82 pivotally mounted, at its rearmost end, to a clevis bracket 83 supported by an inner wall 84 extending between the side walls 67 of the CCR unit 33. Toggle movement of the third link 79 thus tends to straighten the upper and lower links 77,78 into alignment with one another, and drive the knife slide 73 and blade 74 downwardly, to shear the fiber tows 23, when the tow guide housing 62 is in the fully retracted position.

The tow drive housing 64 is supported on guide rollers 85 located in the side walls 67, and the tow guide plates 63 rest between upper and lower pairs of support rollers 86, journalled on shafts 87 in the channel bracket 68.

Referring to FIGS. 9a,9b, and 5b, the gear shaft 317 rotatably supports a drive gear 89 located mid-span of the side walls 67a and 67b. The gear 89 is secured with a set screw 90 and pin 91 for positive rotation, and side collars 92,93, adjacent the drive gear 89, serve to space the gear 89 and provide journals for captively-carrying a pair of ball bearings 94. The bearings 94 bear on the top side of the tow guide housing 62, cooperating with the lower guide rollers 85 to form an antifriction way system for the housing 62.

The drive gear 89 meshes with a rack 95 located in a slot 96 machined in the top surface of the upper section 64a of the rear guide member 64, and the rack 95 is secured by plural countersunk flat head cap screws 97.

The gear shaft 317 is driven in reversible directions by the servomotor 66, and the rack 95 thus provides a positive linear drive element for positioning the tow guide housing 62.

Figure 13:
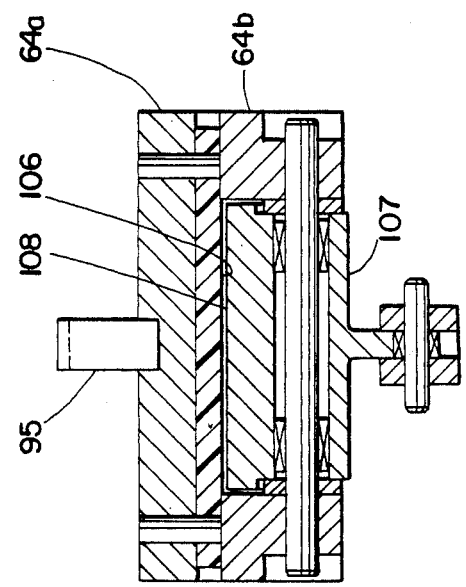
FIG. 13 is an elevational section through the two guide housing taken along the line 13—13 of FIG. 10.

Referring to FIG. 6, the tow drive housing 64 of the movable tow guide housing 62 has a grooved guide roller assembly 65 journalled on a tubular pin 104, the guide roller assembly 65 being essentially the same grooved roller assembly as is used in the redirect roller assemblies 38. The roller assembly 65 is assembled from single-groove rings 98, i.e. each having a thin annular flange 99 at each side, and the rings 98 are carried by their ball bearings 100 on the tubular pin 104 so there will be virtually no drag on the tows 23. The upper and lower sections 64a,b of the tow drive housing 64 are pivotally carried with one another around the tubular pin 104 so that the two may be hinged apart and together. The arrangement shown in FIG. 5b illustrates the two sections 64a,b together, where they are locked in assembly by clamp screws 105 (see FIGS. 10 and 16a). The upper section 64a has an anvil 106 pinned to it and lying adjacent the tows 23, and a pivotable cam link 107 is pivotally carried in the lower section 64b so that, as the link 107 pivots in a clockwise direction (as viewed in FIG. 5b), a cam surface 108 will clamp the tows 23 tightly to the anvil 106. The anvil 106 is made preferably from resilient stock, such as urethane. A clevis-mounted fluid actuator 109, is carried by a bracket 109a on the lower section 64b, and its movable piston rod 110 is connected to the cam link 107 to clamp and unclamp the tows 23. Thus, when the piston rod 110 is extended from the actuator 109, the cam surface 108 will be unclamped from the tows 23, as shown in FIG. 3a. Details of the link 107 mounting arrangement are shown in FIG. 13.

The inner wall 84 serves as a fluid manifold and mounting member for solenoid-operated fluid control valves 101 interconnected with a fluid supply port 102 and the fluid actuators 81,109.

FIG. 6 shows the tubular pin 104, with a head 111 at one end and having a transverse pin 112 captivating a compression spring 113 at the other end. The transverse pin 112 may be fitted with a ring 114 for ease of disassembly.

Referring to FIGS. 10–16a, the tow guide housing 62 is depicted in isolation. One tow guide plate 63 is fastened to the lower section 64b of the tow drive housing 64 by a plurality of countersunk flat head cap screws 115. A like plurality of countersunk cap screws 115 secures the other tow guide plate 63 to the upper section 64a of the tow drive housing 64. In operation, the upper and lower sections 64a,b of the tow drive housing 64 are locked together by a pair of large countersunk flat head cap screws 105, with an auxiliary holding force from a U-shaped spring clamp clip 103 applied to the tow guide plates 63. When threading new fiber tows 23 through the tow guide housing 62, the large countersunk screws 105 and clip 103 are removed and the assembly hinged open about the tubular pin 104 (see FIG. 16a). The assembly is thus easily field disassembled and reassembled to facilitate operations.

When it is desired to shear the tows across the full band width to finish a run of fibers, the tow drive housing 64 is run to the fully-retracted position under the impetus of the drive gear 89, with the cam link 107 in the unclamped, counterclockwise position shown in FIG. 6.

Once the tow guide housing 62 is in the fully-retracted position, the cam link 107 is moved by the actuator 109 to clamp the fiber tows. The knife slide 73 is then driven by its actuator 81 to cut the tows with the knife blade 74. The knife blade 74 is then withdrawn to the position shown in FIG. 5b. Thereafter, to restart a new run of tows 23, the tow guide housing 62 (still clamped to the incoming tows) is driven by the servomotor 66 to the fully-advanced position, where the tows 23 will reach into the nip 26a formed between the presser 34a and the work surface 26. The tow guide housing 62 thus not only forms a lateral spacing member for the side-by-side fiber tows, but also forms a linear feed ratchet which, when clamped to the sheared tows, will advance the tows to the presser 34a and workpiece surface 26 at a selected time.

Once the cut tows 23 have been advanced and tacked to the workpiece surface 26, the cam link 107 is actuated to unclamp the tows 23, and the tow guide housing 62 is retracted to an intermediate position so that the tows 23 will be dispensed tangent to the presser 34a.

Figure 11:
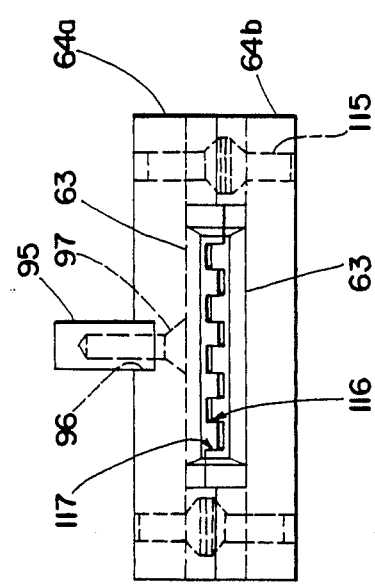
FIG. 11 is an end view of the tow guide housing taken along the line 11—11 of FIG. 10.
Figure 16A:
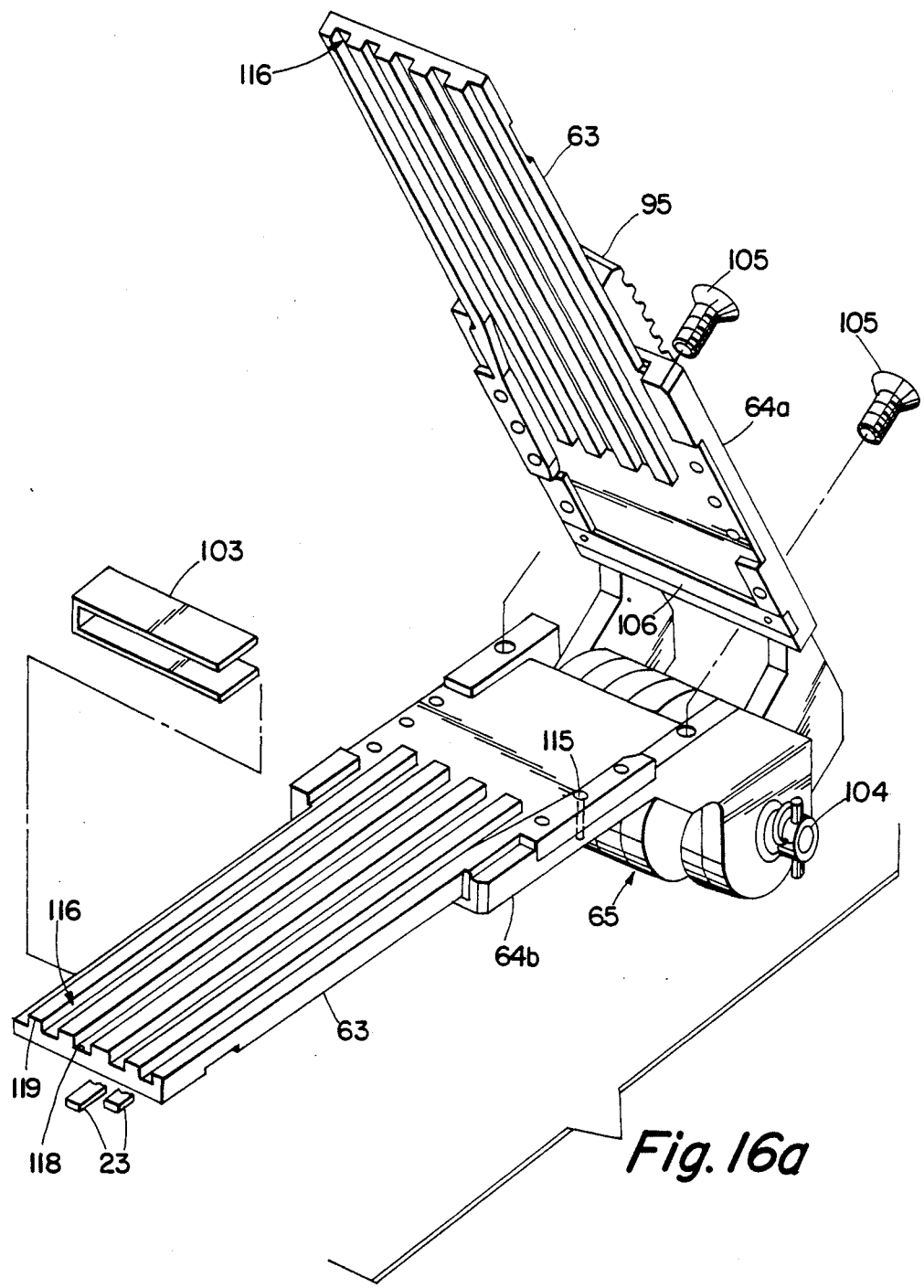
FIG. 16a is a perspective view of the tow guide housing with the top and bottom sections hinged apart to load tows.

The incoming tows 23 are slightly spaced-apart in a common plane by the grooved roller assembly 65, whereas the tow guide plates 63 are internally grooved to maintain the tows 23 side-by-side with one another, i.e., substantially parallel—in two (upper and lower) parallel planes. FIGS. 11 and 16a show that the tow guide plates 63 are provided with squared linear grooves 116 having enmeshed sides 117 which complementarily fit one another, so that the tows 23 will be carried side-by-side in channels formed by the respective valleys 118 and crests 119 when viewed in a plan view (for example, as in FIG. 6), yet the tows 23 run in two different planes to maintain separate control. Once the tows 23 are pulled down under the presser member 34, as in FIG. 3a, they will be pressed into the same plane, i.e. in a contiguous relationship to one another.

Figure 16B:
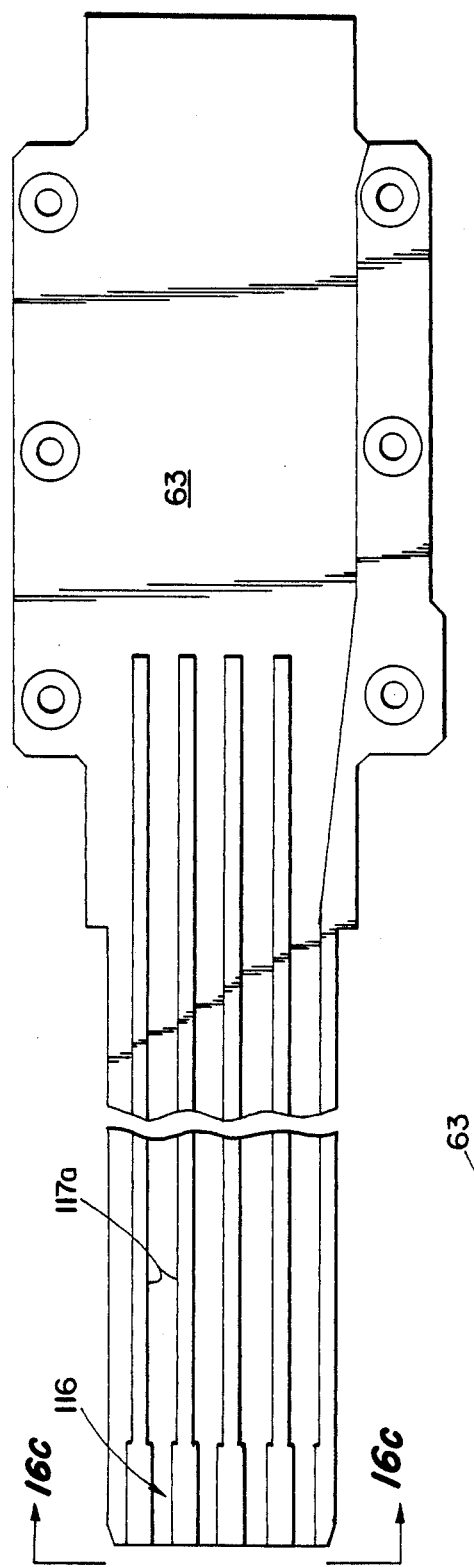
FIG. 16b is a plan view, in isolation, of one of the two guide plates.
Figure 16C:
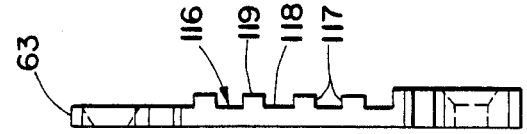
FIG. 16c is an end view of the tow guide plate, taken along the line 16c—16c of FIG. 16b.

FIG. 16b shows the grooves 116 as having a slight relief 117a in the walls 117 for most of the length. The spaced tows converge from the roller assembly 65 to parallelism within the grooves 116.

PRESSER MEMBER ASSEMBLY

Figure 18:
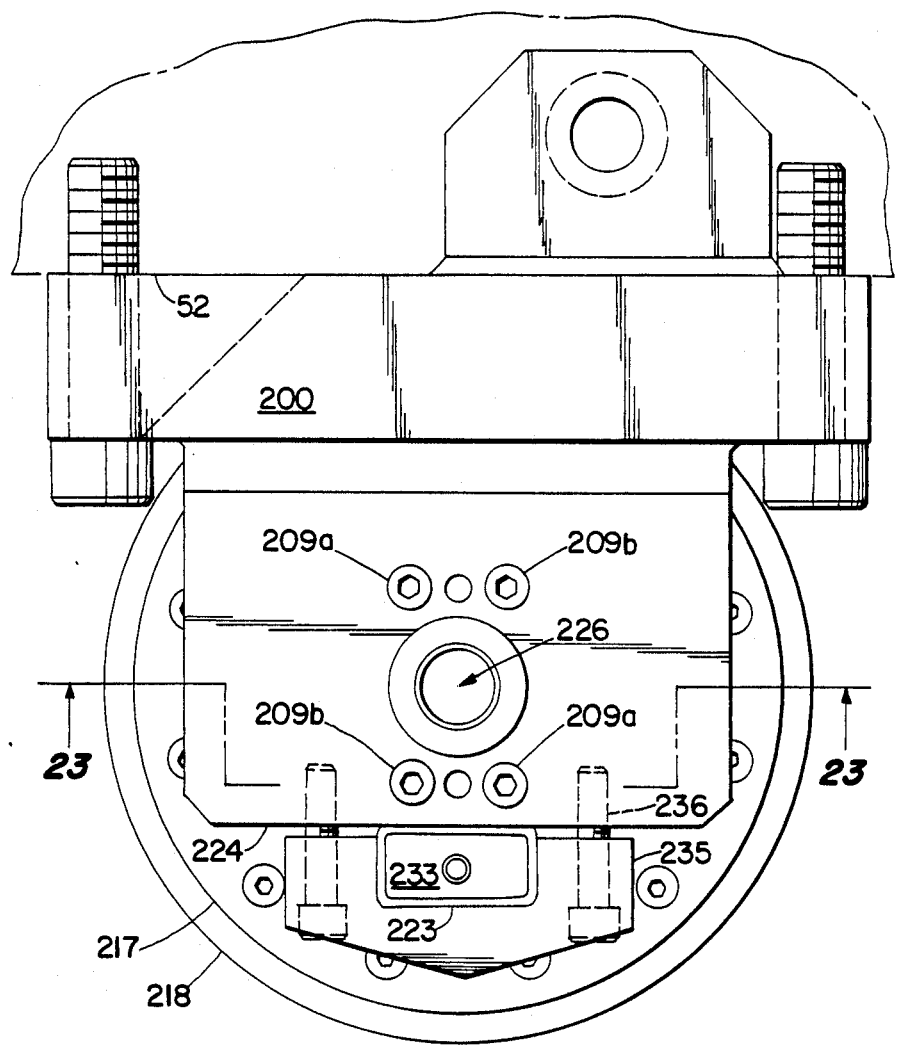
FIG. 18 is a side profile view of the presser member assembly.
Figure 19:
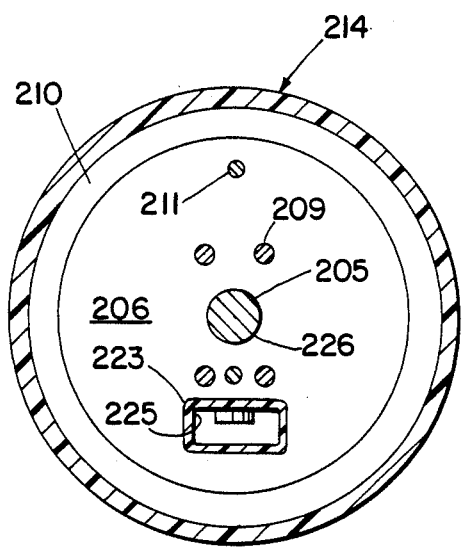
FIG. 19 is a side elevational section taken along the line 19—19 of FIG. 17.
Figure 20:
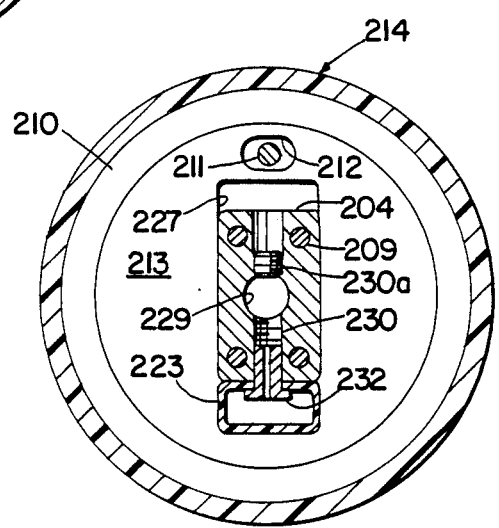
FIG. 20 is a side elevational section taken along the line 20—20 of FIG. 17.
Figure 21:
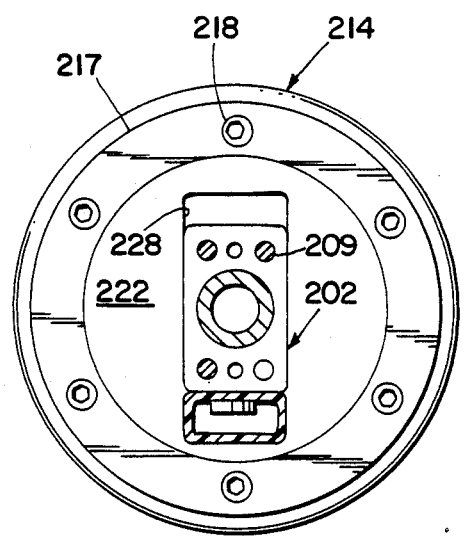
FIG. 21 is a side elevational section taken along the line 21—21 of FIG. 17.
Figure 23:
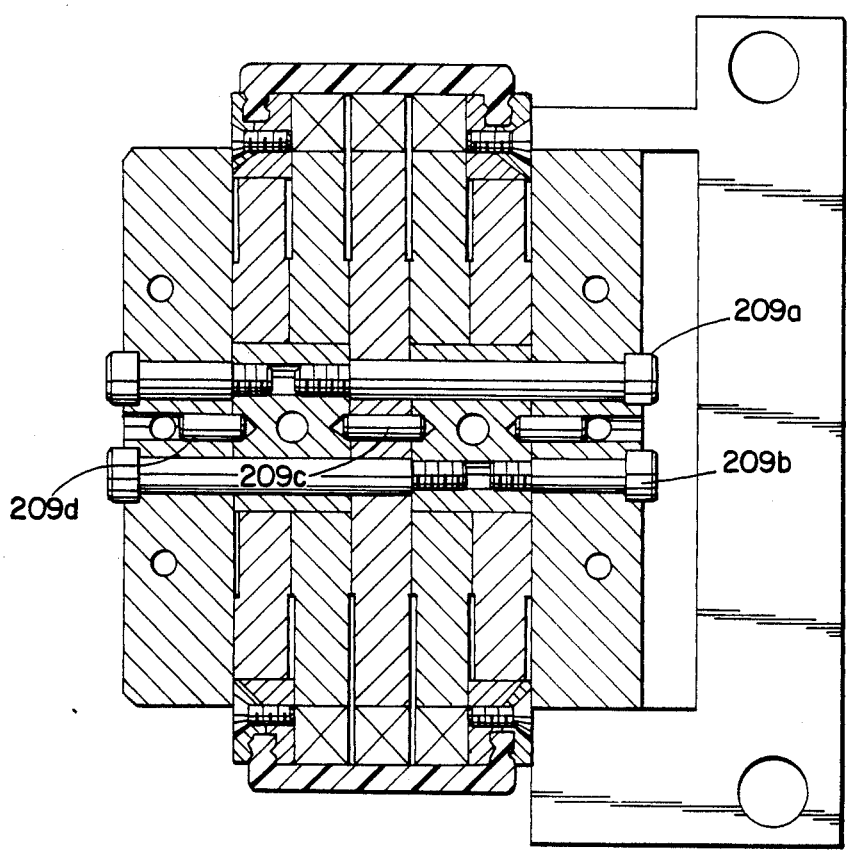
FIG. 23 is a sectional view through the presser member, taken along the line 23—23 of FIG. 18.

Referring now to FIGS. 17 and 18, the presser member assembly 34 is shown cantilevered off the lower surface 52 of the vertical slide 49. An angle bracket 200, extending downwardly from the plate 49, has a horizontal bore 201 which carries a support shaft 202. The support shaft 202 has a main diameter 203, received in the bore 201, and has a rectangular head 204 oriented with its long dimension vertical, with a short pilot 205 extending from the head 204. A thin central disc 206 is received on the pilot 205 and a second, identical, support shaft 202 is inserted from the opposite side of the disc 206. The main diameter 203 of the second support shaft 202 receives a generally-cylindrical outboard retainer block 207 having a chordal bottom surface 208, and the pieces are pulled together in unitary assembly by upper and lower sets of long and short cap screws 209a,b, and aligned by pins 209c,d, in the manner shown in FIG. 23. In essence, therefore, the unit forms a stable axle having side guides. A central ball bearing 210 is received on the central disc 206, and a stroke-limiting pin 211 extends from the sides of the disc 206, near the top. The pin extends into vertically-controlled slots 212 machined through a pair of matching intermediate discs 213 which are adjacent to the central disc 206. A pair of ball bearings 210, identical to the central ball bearing 210, are received on the intermediate discs 213. A flexible tubular elastomeric tire, or sleeve 214, having annular end lips 215, is received over the three bearings 210, and is captivated at each of its opposite end lips 215 by a clamp ring assembly having inner and outer rings 216,217 facially secured to one another by countersunk cap screws 218. The rings 216,217 have annular ridges 219,220 to retain the distortable sleeve 214. Each inner ring 216 has a central bore 221 having a smooth running fit with an end disc 222. A closed-end elastomeric air tube 223, of rectangular cross-section (see FIG. 18), extends across the bottom surfaces 224,208 of the angle bracket 200 and outboard retainer block 207, and the tube 223 extends through the central disc 206, intermediate discs 213, and end discs 222. The tube 223 forms a fluid-filled bladder, or biasing spring. The central disc 206 (see FIG. 19) is provided with a rectangular aperture 225, the exact shape of the tube 223, since the central disc 206 does not move with respect to the central axis 226 of the assembly. However, each intermediate disc 213 (see FIG. 20) has an elongated slot 227 closely-fitted to the sides of the shaft head 204, extending above the head 204 and around the elastomeric tube 223, since the disc 213 is designed to float in vertical directions. Similarly, each end disc 222 (see FIG. 21) is provided with an elongated vertical rectangular slot 228. When the sleeve 214 is against a surface, parallel to the axis 226 across its width, the intermediate and end discs 213,222 are biased to a position centered with the central disc 206, by the elastomeric tube 223. The support shaft 202 has a central pipe-threaded hole 229 extending to a cross-drilled and tapped hole 230, which interconnects with the elastomeric tube 223, and air fittings 231 (FIG. 17) conduct pressurized air to the tube 223. A pair of hollow, headed bushings 232 are inserted through the interior of the tube 223 and threadably received into the rectangular head 204 to securely clamp and seal the elastomeric tube 223 and provide an air flow passage. The upper ends of the tapped holes 230 are plugged with threaded plugs 230a and the area above the plugs 230a is relieved of threads and connected to side vent holes 204a and 49a. The ends of the tube 223 are closed by snug-fitting rectangular blocks 233 (see FIG. 18) so the tube 223 will maintain its rectangular shape, and the blocks 233 are captivated by pins 234 received in the angle bracket 200 and retainer block 207. A tapped hole 233a is to assist in pulling the block 233 out of the tube 234. A pair of clamps 235 are received around the tube 223 and end blocks 233 and held, respectively, to the angle bracket 200 and outboard retainer block 207 by a pair of cap screws 236.

The intermediate and end discs 213,222 have their widths dimensioned to a smooth, sliding fit with respect to the support shaft head 204.

Therefore, as varying slopes and curvatures are encountered across the sleeve 214, the intermediate discs and their respective bearings 210 will float radially, along with the end discs 222, under the bias force provided by the tube 223, to enable the sleeve 214 to conform to the surface shape 26.

Figure 22:
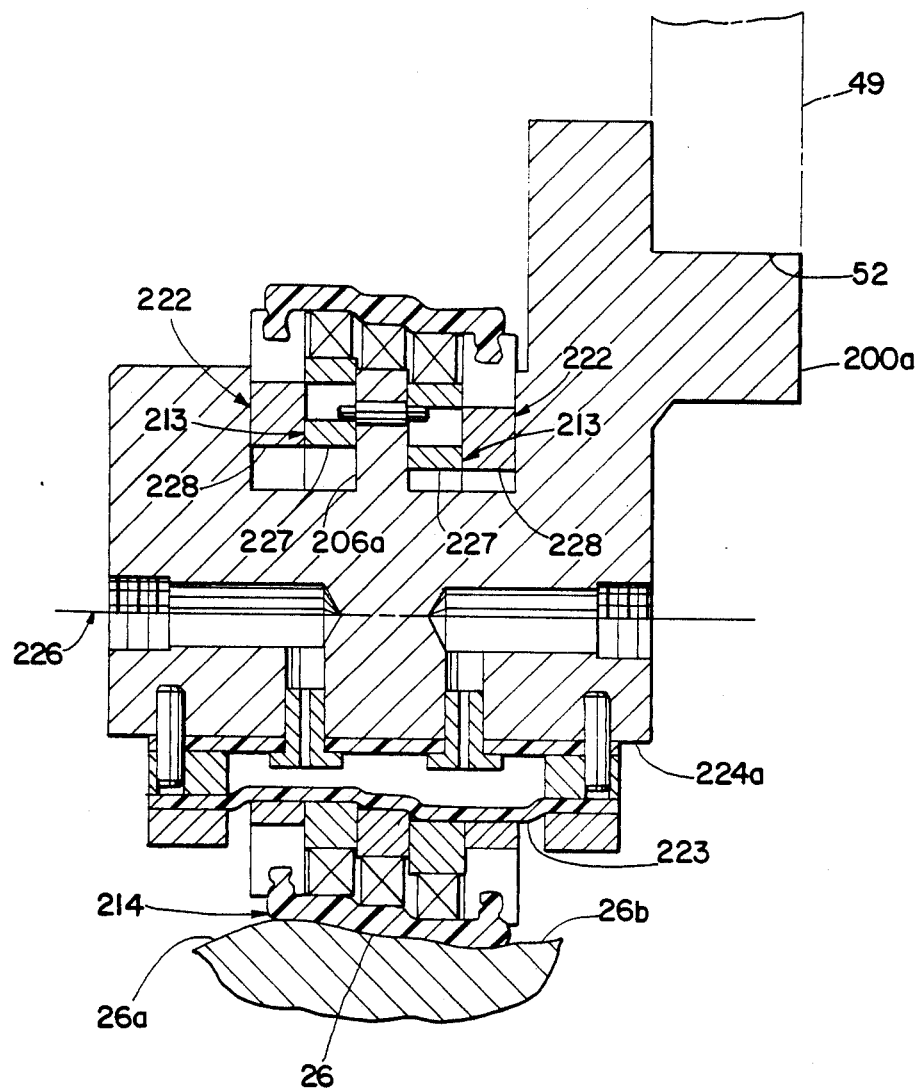
FIG. 22 is a diagrammatic view of the presser member elements of FIG. 17.

FIG. 22 depicts the presser member elements of FIG. 17 in diagrammatic form, illustrating a one-piece angle bracket 200a and showing the flexible sleeve 214 adapted to a work laydown surface 26, thus forming a datum for the reference axis 226. To the left of center, a surface portion 26a rises, and to the right of center a surface portion 26b lowers with respect to the datum surface 26. The central disc portion 206a, is shown integrally fixed to the angle bracket 200a. The bottom surface 224a of the angle bracket 200a facing the work laydown surface 26, extends through the intermediate and end discs 213,222, and also through the central disc portion 206a, the surface 224a forming a convenient reference, or backup, surface for the urethane tube 223.

The bracket surface 224a forms an expansible chamber within each of the apertures 227,228 of the intermediate and end discs 213,222. The pressurized tube 23 acts as an inflated bladder spring to bias the discs 213,222 towards the work laydown surface 26.

It should be appreciated by those skilled in the art, that the wafer-like segments, or discs 206,213,222, may be varied as to quantity and dimension, to achieve a wide range of segmented compactor assemblies.

It should also be appreciated by those skilled in the art that, with modification to the tow guide groove to accommodate the tape width, the CCR unit could be used to process tape (thermoplastic or thermoset) which does not have backing paper.

In some instances the fiber placement head 25 may also employ solid rollers and shoe assemblies, as well as segmented shoe assemblies, which are known for use in composite fabrication machinery, for example, machinery employed to lay composite tape.

While the invention has been shown in connection with a preferred embodiment, it is not intended that the invention be so limited; rather, the invention extends to all such designs and modifications as come within the scope of the appended claims.

What is claimed is:

1. An improved head for use in a fiber placement machine having: a machine member for carrying a fiber placement head; an upstream fiber supply source; a downstream work laydown zone; means for providing relative movement between the machine member and the work laydown zone; and, wherein fiber tows run from the upstream source to the downstream laydown zone in accordance with relative control of the head with respect to the work laydown zone, wherein the improved head comprises:
    bracket means affixed to said machine member;
    presser means movably mounted to said bracket means for impressing said fiber tows in said work laydown zone;
    fiber guide and spacing means movably mounted to said bracket means, said fiber guide and spacing means including means for permitting relatively free movement of said fiber tows with respect to said fiber guide and spacing means and means for clamping said fiber tows to said fiber guide and spacing means, and means for maintaining adjacent fiber tows separate from one another while in said fiber guide and spacing means, said means for maintaining being coextensive with said tows at all times of operation of said fiber guide and spacing means; and
    drive means for relatively moving said fiber guide and spacing means bidirectionally with respect to said bracket means, between an advanced position proximal said presser means, and a retracted position distal said presser means.

2. The improved head of claim 1, further including means for cutting said fiber tows while said fiber guide and spacing means is in the retracted position.

3. The improved head of claim 2, wherein said means for clamping said fiber tows is clamped to said fiber tows when said fiber guide and spacing means is in the retracted position and remains clamped during movement of said fiber guide and spacing means from the retracted position to the advanced position.

4. The improved head of claim 3, further including means for re-starting plural, cut fiber tows.

5. An improved head for use in a fiber placement machine having: a machine member for carrying a fiber placement head; an upstream source for supplying fiber tows; a downstream work laydown zone; means for providing relative movement between the machine member and the work laydown zone; and wherein fiber tows run from the upstream source to the downstream laydown zone in accordance with relative control of the head with respect to the work laydown zone, wherein the improved head comprises:
    bracket means affixed to said machine member;
    presser means on said bracket means for contacting and impressing said fiber tows in said work laydown zone;
    fiber guide and spacing means movably mounted to said bracket means, said fiber guide and spacing means including means for permitting relatively free movement of said fiber tows with respect to said fiber guide and spacing means, means for clamping said fiber guide and spacing means with said fiber tows, and means for maintaining adjacent fiber tows in a side-by-side substantially gap-free relationship when contacted by said presser means;
    drive means for relatively moving said fiber guide and spacing means with respect to said bracket means, between an advanced position proximal said presser means, and a retracted position distal said presser means; and means for cutting said fiber tows while said fiber guide and spacing means is in the retracted position.

6. The improved head of claim 5, where said means for clamping said fiber guide and spacing means is clamped to said fiber tows when said fiber guide and spacing means is in the retracted position and remains clamped during movement of said fiber guide and spacing means from the retracted position to the advanced position.

7. The improved head of claim 5, wherein said fiber guide and spacing means includes:
- a first channel guide member, having a plurality of parallel first grooves and first outer ridges formed between said first grooves;
- a second channel guide member, having a plurality of parallel second grooves corresponding to said first outer ridges and second outer ridges formed between said second grooves corresponding to said first grooves; and
- support and clamping means for mounting said first and second channel members to one another so that said corresponding grooves and ridges are enmeshed to form closed parallel spacing channels for guiding said fiber tows;
- wherein a first plurality of alternately-spaced fiber tows run in a first plane defined by said first and second channel guide members, and a second plurality of alternately-spaced fiber tows run in a second plane defined by said first and second channel guide members, said first and second planes being parallel, and
- wherein said first and second pluralities of fiber tows are maintained in a substantially gap-free parallel relationship when viewed in a direction normal to said planes.

* * * * *

UNITED STATES PATENT AND TRADEMARK OFFICE
CERTIFICATE OF CORRECTION

PATENT NO. : 4,943,338
DATED : July 24, 1990
INVENTOR(S) : Jerry D. Wisbey

It is certified that error appears in the above-identified patent and that said Letters Patent is hereby corrected as shown below:

n the title page, col. 1, the second inventor's name hould read --Helen M. Hayes--.

Signed and Sealed this

Fourth Day of December, 1990

Attest:

HARRY F. MANBECK, JR.

*Attesting Officer*     *Commissioner of Patents and Trademarks*